Figure 1:
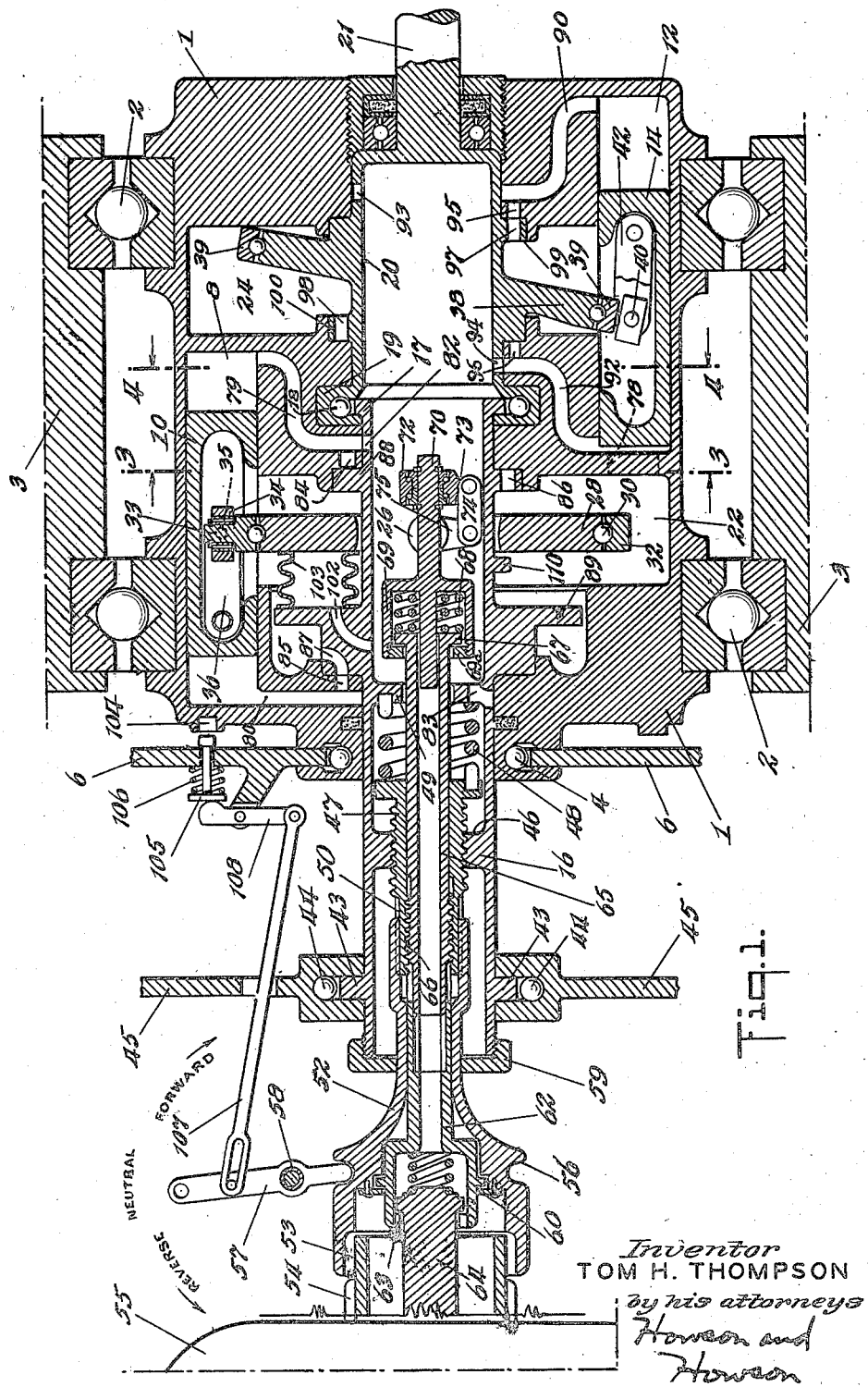

July 23, 1946.  T. H. THOMPSON  2,404,668
FLUID TRANSMISSION
Filed Oct. 28, 1944  3 Sheets-Sheet 3

Inventor
TOM H. THOMPSON
by his attorneys
Howson and Howson

Patented July 23, 1946

2,404,668

UNITED STATES PATENT OFFICE 2,404,668

FLUID TRANSMISSION

Tom H. Thompson, Mamaroneck, N. Y., assignor to Thompson-Wade Corporation, Detroit, Mich., a corporation of Michigan Application October 28, 1944, Serial No. 560,896

18 Claims. (Cl. 60—53)

This invention relates to fluid transmissions and it is an object of this invention to provide a fluid transmission of an improved construction, compact, reliable and of a weight suitable for use in motor vehicles. It is also an object of this invention to provide a fluid transmission in which the maximum fluid pressure is held within a predetermined limit and in which the fluid pressure and liquid volume supplied is automatically adjusted to the motor requirements.

Figure 2:
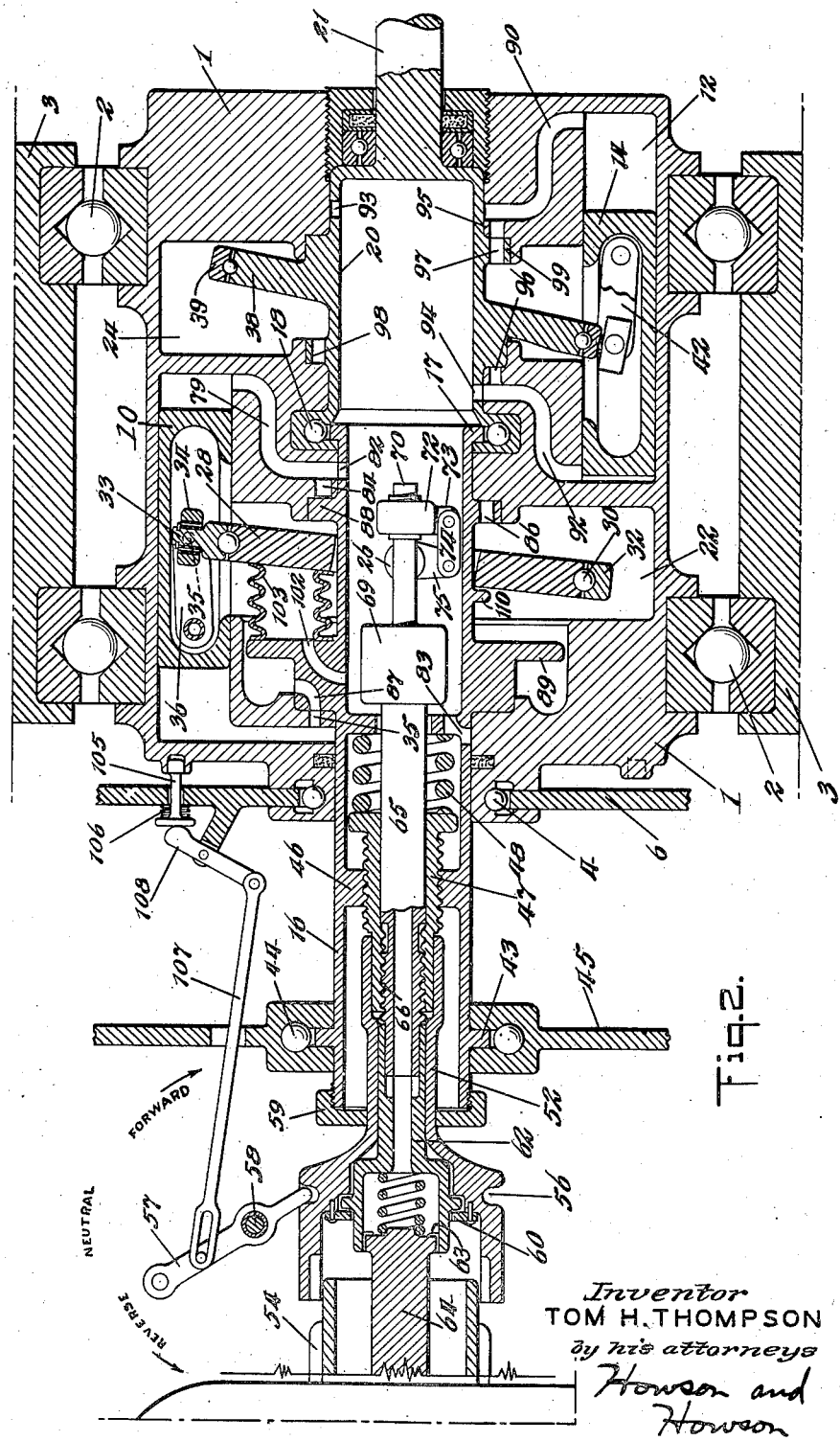
Figure 4:
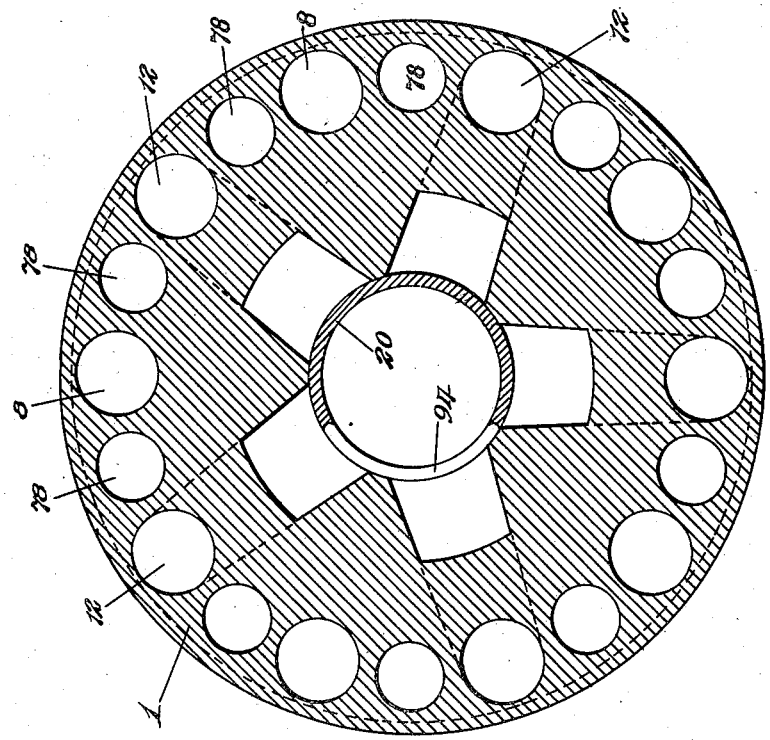
Figure 3:
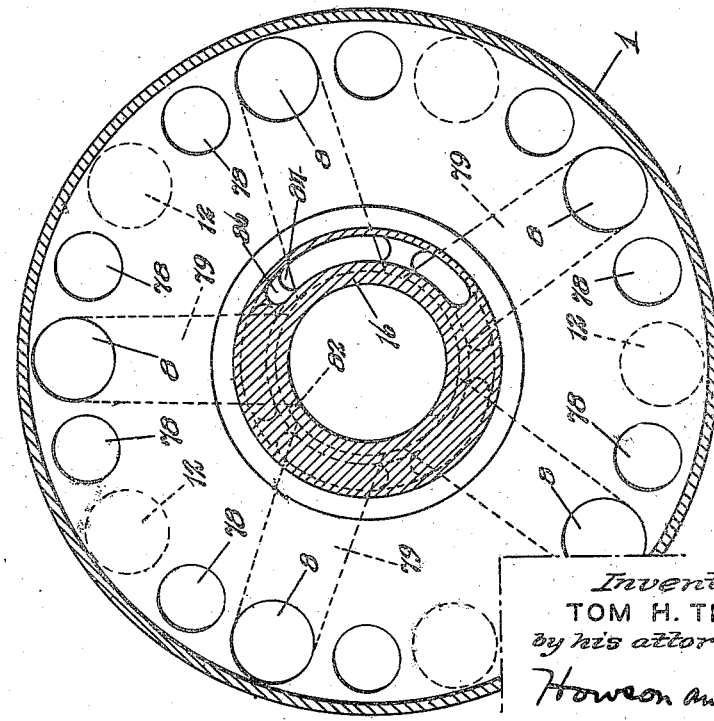

In the drawings in which a preferred construction of the invention is illustrated;

Fig. 1 is a longitudinal sectional view of a fluid transmission in accordance with this invention, the parts being shown in the neutral or inactive position;

Fig. 2 is a view similar to Fig. 1 with the parts shown in the position for reverse operation; and Figs. 3 and 4 are transverse sectional views taken as on lines 3—3 and 4—4, respectively, of Fig. 1, parts being omitted in order to show the ports and passages more clearly.

In the drawings the invention is shown in connection with a transmission suitable for use on motor vehicles.

As shown in the drawings a fluid transmission in accordance with this invention comprises a cylindrical casing 1 rotatably mounted in suitable bearings 2 supported from members 3 carried by the vehicle frame (not shown). The casing 1 is arranged to rotate about its longitudinal axis but is limited to rotation in one direction, the direction of engine rotation, by means of an over-running clutch 4 adapted to engage the casing 1 and a member 6 attached to the vehicle frame. At one end the casing 1 is formed with a plurality of pump cylinders 8 spaced uniformly about the casing 1 and having pump pistons 10 therein while at its opposite end the casing 1 is formed with a plurality of motor cylinders 12 having the motor pistons 14 therein. Preferably there are the same number of motor cylinders as pump cylinders and for the purpose of illustration in the drawings the casing 1 is shown as formed with five cylinders at each end of the casing.

Rotatably mounted in the pump end of the casing 1 is a substantially tubular member 16 which extends inwardly for about a half of the length of the casing 1 and is provided at its inner end with a flange 17 which is engaged by an overrunning clutch 18 with a co-operating flange 19 of a substantially tubular member 20 journalled in the motor end of the casing 1 and terminating in a solid portion forming a drive shaft 21. The clutch 18 is arranged to prevent the member 20 rotating at a greater speed than the member 16 while permitting the member 16 to rotate more rapidly than the member 20.

The casing 1 is provided with a chamber 22 which is in open communication with the central portion of each pump cylinder 8 and with a second chamber 24 in open communication with the central portion of each motor cylinder 12. Projecting into the chamber 22 from opposite sides of the member 16 are rotatable pivots 26 to which is fixed an annular disk 28 which surrounds the member 16. The disk 28 is recessed on its perimeter to receive roller bearings 30 on which is mounted a ring 32 having uniformly spaced radially projecting pins 33, there being a pin 33 for each pump piston 10. Collars 34 rotatably mounted on the pins 33 have projections 35 to which are pivotally connected ends of links 36 the other ends of which are pivotally connected to the pump pistons 10. Secured to the member 20 at a fixed inclination to the axis thereof is a disk 38 having rotatably mounted thereon a ring 39 having pins 40 connected by links 42 to the motor pistons 14 in a manner similar to the connection of the pins 33 to the pistons 10.

The tubular member 16 projects beyond the pump end of the casing 1 and is provided with a collar or flange 43 adapted to be connected by an overrunning clutch 44 to a member 45 carried by the vehicle frame, the clutch 44 limiting the tubular member 16 to rotation in one direction. The interior of the tubular member 16 is provided with a threaded collar 46 in which is engaged a tubular member 47 having a right hand thread engaged with the collar 46 and a flanged inner end to which is secured one end of a spring 48, the other end of which is secured to an inwardly projecting collar 49 on the tubular member 16. The outer face of the other end of the member 47 is shaped to form splines 50 which are slidably engaged with the correspondingly shaped inner face of the adjacent end of a tubular member 52, the other end of which is of greater diameter and shaped, as at 53, to form a clutch member adapted to engage with a clutch member 54 driven from a suitable source of power 55.

The member 52 is grooved, as at 56, for engagement by a shift lever 57 which is pivotally mounted, as at 58, and serves to shift the member 52 into and out of engagement with the clutch member 54. The member 52 is freely slidable on the member 47 and in the closure 59 at the end of the tubular member 16.

Mounted in the tubular member 52 and secured therein by a ring 60 secured to the member 52 so as to be reciprocated with the member 52 is a tubular member 62 having its outer end enlarged and shaped, as at 63, to form a clutch member adapted to engage with a clutch member 64 driven from the source of power 55. The clutch members 53, 54 and 63, 64 are so positioned and arranged that only one pair of the clutch members can be engaged at a time, the different pairs of the clutch members being engaged by movement of the lever 57 in opposite directions. The inner end of the member 62 is slidably splined to an end of a tubular member 65 rotatably mounted in the member 47 and having a left hand thread 66 engaging with a corresponding thread on the inner face of the member 47. The member 65 extends inwardly beyond the collar 49 on the member 16 and at its inner end is provided with a flange 67 which forms a seat for a spring cluster 68 secured in an annular chamber in a cup-shaped member 69 having a central stem 70 extending in opposite directions from the member 69. The annular chamber in the member 69 is closed by a ring 69a screwed into the member 69 and serving to hold the member 65 engaged with the member 69 and the spring cluster 68 under an initial loading of 1800 pounds. The stem 70, in one direction, projects into the tubular member 65 and aids in supporting the member 69. The extension of the stem 70 in the opposite direction has journaled thereon adjacent its free end a ring 72 having projecting lugs 73 to which one end of links 74 are pivotally connected. The other ends of the links 74 are pivotally connected to the outer ends of the arms 75 fixed to the pivotal supports 26 for the disk 28.

The casing 1 is provided with passages 78 positioned between the pump cylinders 8 and the motor cylinders 12 and connecting the chambers 22 and 24. A passage 79 extends from the inner end of each pump cylinder 8 to the chamber in which the tubular member 16 rotates and a passage 80 extends from outer end of each pump cylinder 8 to the same chamber. Ports 82 and 83 in the tubular member 16 control the connection of the passages 79 and 80, respectively, to the interiors of the tubular members 16 and 20; the passages 79 and 80 having openings extending approximately 60° about the face of the chamber and the ports 82 and 83 extending approximately 120° on the face of the tubular member 16 so that each passage is open to the interior of the tubular member 16 throughout substantially a half revolution of the tubular member 16. The ports 82 and 83 are positioned so that one passage 79 or 80 is closed when the other passage is open. Branch passages 84 and 85 extend from passages 79 and 80, respectively, and are connected to chamber 22 by ports 86 and 87, respectively, in flanges or collars 88 and 89, respectively, projecting from the tubular member 16. The passages 84 and 85 also extend through an arc of approximately 60° and the ports 86 and 87 extend through an arc of 120° so as to establish connection with the chamber 22 during a half revolution of the tubular member 16, one passage 84 or 85 being closed while the other passage is open. Ports 82 and 83 and ports 86 and 87 are so related that one end of a pump cylinder is connected to the interior of the tubular member 16 while the opposite end of that pump cylinder is connected to the chamber 22 and the ports in the tubular member 16 are so positioned with respect to the pivots 26 supporting the disk 28 that the connections established by the ports are changed as the direction of movement of the pump pistons 10 are changed by the rotation of the disk 28.

The motor end of the casing 1 is similarly provided with passages 90 and 92 leading from opposite ends of each motor cylinder to the chamber in which the tubular member 20 revolves, communication with the interior of the tubular member 20 being controlled by ports 93 and 94 respectively. Extending from the passages 90 and 92 are branch passages 95 and 96 respectively, connected by ports 97 and 98, respectively, in flanges 99 and 100, respectively, on the tubular member 20. The ports and passages of the motor end of the casing 1 correspond in size and position to the ports and passages at the pump end of the casing so that one end of a motor cylinder is connected to the interior of the tubular member 20 during a half revolution of the member 20 while the opposite end of that motor cylinder is connected to the chamber 24 and the change in the fluid connections each half-revolution of the member 20 and disk 38 causes a change in the end of the motor piston 14 to which the operating pressure is applied.

The flange 89 of the tubular member 16 is provided with a passage 102 constantly open to the interior of the tubular member 16 and extending to the interior of an expandible member 103 secured to the adjacent faces of the flange 89 and the disk 28 so as to subject a definite area of the disk 28 to the pressure of the fluid in the interior of the tubular members 16 and 20.

The casing 1 at one end is formed with a circle of recesses 104 adapted to receive a locking plunger 105 mounted in the member 6 and normally held retracted by a spring 106. The plunger 105 is operated to engage in a recess 104 and prevent rotation of the casing 1 in either direction when the lever 57 is operated to the "reverse" position, the lever 57 being connected to a link 107 which is connected to a lever 108 mounted on the member 6 in position to engage the plunger 105. A pin and slot connection between the lever 57 and link 107 permits the lever 57 being operated to the "forward" position without operating the plunger 105.

In the operation of the device, the source of power being operating and rotating the clutch members 54 and 64, moving the operating lever 57 to the right to the "forward" position shifts the member 52 to engage the clutch member 53 and 54 and causing the members 52 and 47 to be rotated. Rotating the member 47 causes the member 47 to be shifted longitudinally (to the right in Fig. 1), owing to its right-hand thread connection with the member 16, compressing the spring 48 and increasing the resistance to the movement of the member 47 in the member 16. The spring 48 may be designed to be compressed solid by a pressure of approximately 350 pounds. The resistance to the rotation of member 47 in member 16 eventually becomes sufficient to cause member 16 to rotate with member 47 and rotate the disk 28. Movement of member 47 to the right has carried with it the members 65 and 69 causing the disk 28 to be tilted from the position shown in Fig. 1 so that rotation of the disk 28 causes reciprocation of the pump pistons 10. Rotation of the casing 1 in the reverse direction at this time is prevented by the clutch 4. As shown, the ports and passages are so arranged that operation of the pump pistons when the lever 57 is in the "forward" position will cause the discharge of fluid under pressure to the interiors of the tubular members 16 and 20 and thence to the motor cylinders to operate pistons 14 and fluid will be discharged from the motor cylinders to the chamber 24, passing through passages 78 to chamber 22 and then to the pump cylinders. Operation of the pump pistons 10 by the rotation of the disk 28 accordingly builds up fluid pressure in the interiors of the members 16 and 20 and against the motor pistons 14, the pressure being built up in accordance with the resistance offered to the rotation of the shaft 21 and disk 38. The pressure in the tubular members 16 and 20 is also applied to the disk 28 through the passage 102 and member 103 in a direction to shift the disk 28 so as to reduce the stroke of the pump pistons from their maximum stroke but this movement of the disk 28 is yieldingly resisted by the springs 68, member 65 being held by its threaded connections through member 47 with the member 16.

As the resistance to the movement of the motor pistons 14 decreases, the rate of movement of the pistons 14 will increase and the fluid pressure acting against the disk 28 will decrease permitting the spring 68 to gradually increase the tilt of the disk 28 until the pump pistons 10 are again operating at maximum stroke. The balancing of the fluid pressure against a predetermined spring pressure provides an automatic control which insures the maintenance of a supply of fluid at maximum pressure delivered to the motor in a volume in accordance with the instantaneous requirements of the motor. The transmission is thus able to cover the entire range to maximum torque requirement in steps of infinitesimal magnitude while remaining instantaneously responsive to variations in torque demand.

By having the volumetric capacity of the pump greater than the volumetric capacity of the motor, the motor eventually tends to rotate the tubular member 20 and shaft 21 faster than the speed of rotation of the tubular member 16 but such greater speed on the part of the member 20 is prevented by the engagement of the over-running clutch 18.

When the clutch 18 engages, the transmission may be said to be in "direct drive" a condition in which the entire transmission, including the casing 1, tends to revolve as a unit. With the release of the driving power from the member 52, the tendency of the member 47 to rotate in the member 16 against the action of the spring 48 is ended and the spring 48 tends to rotate the member 47 in the member 16 and shift the members 65 and 69 to the left to their initial positions and thus operate the disk 28 to reduce its inclination and the stroke of the pump pistons 10.

To obtain a reverse operation of the transmission the lever 57 is moved forward to the "reverse" position shifting the member 52 away from the clutch member 54 and carrying the member 62 to the right, as shown in Fig. 2, to engage the clutch members 63 and 64. With the clutch members 63 and 64 engaged the members 62 and 65 will be rotated in the same direction as was the member 52 but the left hand thread connection of the member 65 with the member 47 will cause the member 65 to be shifted to the left as it is rotated, drawing with it the member 69 and its stem 70 and through links 74, arms 75 and pivots 26, tilting the disk 28 in the opposite direction until further tilting movement of the disk is prevented by the stop 110. This tilting movement of the disk 28 effects a movement of the pump pistons 10 and changes the relation of the disk 28 and pump pistons 10 with respect to the valve ports 82, 83 and 86, 87 so that the pump pistons 10 now discharge fluid under pressure to the chamber 22 and through passages 78 to chamber 24 and then to the motor cylinders while fluid is supplied to the pump cylinders from the interior of the tubular members 16 and 20. As the relation of the disk 38 and the tubular member 20 is not changed reversing the tilt of the disk 28 causes a reversal in the operation of the motor pistons 14 and the rotation of the disk 38 and tubular member 20 and shaft 21.

What is claimed is:

1. In a fluid transmission, a casing, pump pistons mounted for reciprocation in said casing, a disk in said casing, means supporting said disk for relative rotation of said disk and pistons comprising means connecting said disk and its supporting means permitting variation of the inclination of the plane of said disk relative to the axes of said pistons, means operatively connecting said disk and pump pistons to reciprocate said pistons upon relative rotation of said disk and pistons and driving means for relatively rotating said disk and pistons comprising means responsive to the resistance to said relative rotation for selectively inclining the plane of said disk relative to the axes of said pistons.

2. In a fluid transmission, a casing, pump pistons mounted for reciprocation in said casing, a disk in said casing, means supporting said disk for relative rotation of said disk and pistons comprising means connecting said disk and its supporting means permitting variation of the inclinaton of the plane of said disk relative to the axes of said pistons, means operatively connecting said disk and pump pistons to reciprocate said pistons upon relative rotation of said disk and pistons, driving means for relatively rotating said disk and pistons comprising means responsive to the resistance to said relative rotation for selectively inclining the plane of said disk relative to the axes of said pistons.

3. In a fluid transmission, a casing, pump pistons mounted for reciprocation in said casing, a disk in said casing, means supporting said disk for relative rotation of said disk and pistons comprising means connecting said disk and its supporting means permitting variation of the inclination of the plane of said disk relative to the axes of said pistons, means operatively connecting said disk and pistons to reciprocate said pistons upon relative rotation of said disk and pistons, driving means for relatively rotating said disk and pistons comprising means responsive to the resistance to rotation of said disk for inclining the plane of said disk relative to the axes of said pistons and means to apply the fluid pressure generated by said pump pistons for changing the inclination of said disk to reduce the stroke of said pump pistons.

4. In a fluid transmission, a casing, pump pistons mounted for reciprocation in said casing, a disk in said casing, means supporting said disk for relative rotation of said disk and pistons comprising means connecting said disk and its supporting means permitting variation of the inclination of the plane of the disk relative to the axes of said pistons, means operatively connecting said disk and pistons to reciprocate said pistons upon relative rotation of said disk and pistons, driving means for relatively rotating said disk and pistons comprising means responsive to the resistance to rotation of said disk for inclining the plane of said disk relative to the axes of said pistons and means to apply fluid pressure generated by said pump in a direction to reduce the inclination of the plane of said disk.

5. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk and drive means for rotating said disk, said drive means having selectively operated means responsive to the resistance to rotation of said disk for moving said disk about said second axis upon operation of said drive means to rotate said disk.

6. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk and selectively operated drive means for rotating said disk, said drive means comprising engaging co-axial members relatively shifted by the resistance to rotation of said disk to move said disk about said second axis upon operation of said drive means to rotate said disk.

7. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk and drive means for rotating said disk, said drive means comprising engaging co-axial members, means for relatively shifting said co-axial members to move said disk about said second axis upon operation of said drive means to rotate said disk and means yieldingly opposing said relative movement of said co-axial members upon operation of said drive means to rotate said disk.

8. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocation said pistons upon rotation of said disk and drive means for rotating said disk, said drive means comprising engaging co-axial members, means for relatively shifting said co-axial member to move said disk about said second axis upon operation of said drive means to rotate said disk and a spring means opposing said relative movement of said co-axial members upon operation of said drive means to rotate said disk, said spring means operating to return said co-axial members to their initial positions upon the withdrawal of the driving power from said drive means.

9. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk and drive means for rotating said disk, said drive means comprising a pair of power receiving members, co-axial members operated by said power receiving members and means for relatively shifting co-axial members to move said disk about said second axis upon operation of either of said power receiving members to rotate said disk, said power receiving members and said co-axial members being constructed and arranged to move said disk in opposite directions about said second axis.

10. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk and drive means for rotating said disk, said drive means comprising tubular means threaded into said disk supporting means, power receiving means adapted to rotate said tubular means, yielding means opposing relative movement of said tubular means and said disk supporting means upon operation of said power receiving means to rotate said disk and means connecting said tubular means and disk to move said disk about said second axis upon relative movement of said tubular means and said disk supporting means.

11. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, drive means for rotating said disk and means for applying fluid pressure generated by said pistons to move said disk about said second axis, said drive means comprising tubular means threaded into said disk supporting means, power receiving means adapted to rotate said tubular means, yielding means opposing relative movement of said tubular means and said disk supporting means upon operation of said power receiving means to rotate said disk and means connecting said tubular means and disk to move said disk about said second axis upon relative movement of said tubular means and said disk supporting means, said connecting means having yielding means opposing movement of said disk by the fluid pressure.

12. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, drive means for rotating said disk, said drive means having means responsive to the resistance to rotation of said disk for moving said disk about said second axis upon operation of said drive means to rotate said disk, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid under pressure between said pump and motor pistons and ports in said disk supporting means controlling said passages.

13. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, drive means for rotating said disk, said drive means having means responsive to the resistance to rotation of said disk for moving said disk about said second axis upon operation of said drive means to rotate said disk, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid under pressure between said pump and motor pistons, ports in said disk supporting means controlling said passages and clutch means connecting said disk supporting means and preventing said second disk supporting means from rotating faster than said first disk supporting means.

14. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, drive means for rotating said disk, said drive means having means responsive to the resistance to rotation of said disk for moving said disk about said second axis upon operation of said drive means to rotate said disk, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid under pressure between said pump and motor pistons and ports in said disk supporting means controlling said passages, said driving means for said first disk comprising means for varying the relation of said pump pistons and said first disk to the ports in said first disk supporting means to effect a reversal of rotation of said second disk.

15. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, drive means for rotating said disk, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid under pressure between said pump and motor piston and ports in said disk supporting means controlling said passages, said drive means for said first disk having selectively operated means responsive to the resistance to rotation of said disk for rotating said disk about said second axis to reverse the direction of rotation of said second disk.

16. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, a drive means for rotating said disk supporting means and disk comprising means for rotating said disk in one direction about said second axis, a second drive means for rotating said disk supporting means and disk comprising means for rotating said disk in the opposite direction about said second axis, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid between said pump and motor pistons, said disk supporting means having ports controlling said passages and said second disk changing its direction of rotation upon a change in the driving means for said first disk.

17. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, drive means for rotating said disk, said drive means having means responsive to the resistance to rotation of said disk for moving said disk about said second axis upon operation of said drive means to rotate said disk, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid under pressure between said pump and motor pistons, ports in said disk supporting means controlling said passages, clutch means connecting said disk supporting means and preventing said second disk supporting means from rotating faster than said first disk supporting means and clutch means preventing rotation of said casing in a direction opposite to the direction of rotation of said first disk while permitting rotation of said casing in the direction of rotation of said first disk.

18. In a fluid transmission, a casing, pump pistons mounted for reciprocation in said casing, a disk in said casing, means supporting said disk for rotary movement and movement about a second axis at an angle to the axis of rotation, means operatively connecting said disk and pistons for reciprocating said pistons upon rotation of said disk, a drive means for rotating said disk supporting means and disk comprising means for rotating said disk in one direction about said second axis, a second drive means for rotating said disk supporting means and disk comprising means for rotating said disk in the opposite direction about said second axis, a second disk in said casing, means rotatably supporting said second disk, motor pistons mounted for reciprocation in said casing, means connecting said motor pistons and said second disk to rotate said second disk upon reciprocation of said motor pistons, said casing having passages for the supply of fluid between said pump and motor pistons, said disk supporting means having ports controlling said passages and said second disk changing its direction of rotation upon a change in the driving means for said first disk, clutch means preventing rotation of said casing in a direction opposite to the rotation of said first disk while permitting rotation of said casing in the direction of rotation of said first disk when said first drive means is operated and means preventing rotation of said casing when said second drive means is operated.

TOM H. THOMPSON.